(12) United States Patent
Kallesøe et al.

(10) Patent No.: US 11,953,867 B2
(45) Date of Patent: Apr. 9, 2024

(54) MULTI-PUMP CONTROL SYSTEM

(71) Applicant: GRUNDFOS HOLDING A/S, Bjerringbro (DK)

(72) Inventors: Carsten Skovmose Kallesøe, Bjerringbro (DK); Mogens Groth Nicolaisen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 383 days.

(21) Appl. No.: 17/376,687

(22) Filed: Jul. 15, 2021

(65) Prior Publication Data

US 2022/0019182 A1 Jan. 20, 2022

(30) Foreign Application Priority Data

Jul. 17, 2020 (EP) .................................. 20186495

(51) Int. Cl.
*G05B 13/04* (2006.01)
*G08B 21/18* (2006.01)
*H04Q 9/02* (2006.01)

(52) U.S. Cl.
CPC ......... *G05B 13/048* (2013.01); *G08B 21/182* (2013.01); *H04Q 9/02* (2013.01); *H04Q 2209/60* (2013.01)

(58) Field of Classification Search
CPC .... A61H 2201/0103; A61H 2201/0192; A61H 2201/1223; A61H 2201/1238;
(Continued)

(56) References Cited

U.S. PATENT DOCUMENTS 7,480,544 B2 1/2009 Wang et al.
10,794,384 B2 10/2020 Hillerup Lyhne et al.
(Continued)

FOREIGN PATENT DOCUMENTS

EP 3428452 A1 1/2019
JP 2008014230 A 1/2008
WO WO-2008121051 A1 * 10/2008 ............. A01J 5/047

*Primary Examiner* — Chun Cao

(74) *Attorney, Agent, or Firm* — McGlew and Tuttle, P.C.

(57) ABSTRACT

A multi-pump control system with a control module, a processing module, communication interface, and a storage module. The system is configured to change a number n of running pumps, and receive a signal indicative of a power consumption P and information about a speed ω of one of the n running pumps before and after two different changes of the number n of running pumps. The system is configured to determine, before and after at least two different changes of the number n of running pumps, without a measurement of a differential pressure $\Delta p$ and of a flow Q, two approximated pump characteristics $P_n$ and $\Delta \tilde{p}_n$, wherein each of the approximated pump characteristics $P_n$ and $\Delta \tilde{p}_n$ is unambiguously defined by a pair of parameters ($\theta_1$, $\theta_2$; $\theta_3$, $\theta_4$). The system is configured to store the pair of parameters ($\theta_1$, $\theta_2$; $\theta_3$, $\theta_4$) for each of the determined approximated pump characteristics $P_n$ and $\Delta \tilde{p}_n$.

25 Claims, 6 Drawing Sheets

(58) Field of Classification Search
CPC .... A61H 2201/1253; A61H 2201/1409; A61H 2201/164; A61H 2201/5056; A61H 2205/106; A61H 9/0078; A61H 9/0092; G05B 13/048; G08B 21/182; H04Q 2209/60; H04Q 9/02; F04D 13/12; F04D 15/0066; F04D 15/0088; F04D 15/029; F05D 2260/81; F05D 2260/821
USPC ........................................................ 700/282
See application file for complete search history.

(56) References Cited

U.S. PATENT DOCUMENTS

| | | | |
|---|---|---|---|
| 2003/0235492 A1 | 12/2003 | Mirsky et al. | |
| 2015/0045982 A1* | 2/2015 | Egan | G06F 3/0482 700/304 |
| 2015/0148972 A1 | 5/2015 | Blaumann et al. | |
| 2015/0286196 A1* | 10/2015 | Acosta Gonzalez | F04D 15/0209 700/19 |
| 2018/0129177 A1 | 5/2018 | Coin | |
| 2019/0017511 A1* | 1/2019 | Hillerup Lyhne | F04D 15/0066 |

* cited by examiner

… (1) …

MULTI-PUMP CONTROL SYSTEM

CROSS REFERENCE TO RELATED APPLICATIONS

This application claims the benefit of priority under 35 U.S.C. § 119 of European Patent Application no. 20186495.6, filed Jul. 17, 2020, the entire contents of which are incorporated herein by reference.

TECHNICAL FIELD

The present disclosure relates generally to control systems and control methods for a plurality of pumps, in particular a plurality of speed-controlled centrifugal pumps, e.g. as part of a booster pump system. Such a plurality of pumps may be used in a pump station of a water supply network or for pressure boosting in tall buildings.

BACKGROUND

Typically, a pump station of a water supply network may comprise a plurality of identical or different pumps installed in parallel to each other to provide a required fluid flow Q and/or head $\Delta p$ (pressure difference). It is a general goal for a control system to operate such a multi-pump system as energy-efficiently as possible. In order to do so, the control system is usually able to set the number of running pumps and the speed at which the running pumps shall operate.

For instance, U.S. Pat. No. 7,480,544 B2 describes a system of energy-efficient and constant-pressure fluid transport machines coupled in parallel for supplying a pipe system with known nodes and pipe sections.

US 2003/0235492 A1 relates to a method and apparatus for automatic control of multiple pumps operated either in parallel or in series.

US 2015/0148972 A1 describes a device and a method for operating multiple centrifugal pumps with determined number of pumps with least energy consumption.

All of the known control systems or methods require stored pre-knowledge of the pump characteristics provided by the pump manufacturer. However, due to manufacturing tolerances, wear and/or fouling, the real current pump characteristics may be different from the stored information in the control logic. The pump characteristics may change over time.

EP 3428452 A1 describes a solution to find the best subset of pumps for operating the multi-pump system by running several configuration cycles. However, running several configuration cycles takes up significant time and mostly requires measuring and monitoring a pressure differential $\Delta p$.

It is therefore an object of the present disclosure to provide a multi-pump control system that is able to more quickly determine, without stored pre-knowledge of the pump characteristics and without the need of measuring and monitoring a pressure differential $\Delta p$ or a flow Q, an energy-efficient number of running pumps in a certain range of load points.

SUMMARY

In contrast to known multi-pump control systems, embodiments of the present disclosure provide a control system and method to solve the above-mentioned problem.

In accordance with a first aspect of the present disclosure, a multi-pump control system is provided comprising a control module,
a processing module,
a communication interface, and
a storage module,
wherein the control module is configured to change a number n of running pumps of a multi-pump system, wherein the communication interface is configured to receive a signal indicative of a power consumption P and information about a speed $\omega$ of at least one of the n running pumps before and after at least two different changes of an operating parameter of the running pumps, wherein the processing module is configured to determine, before and after at least two different changes of the number n of running pumps, in absence of a measurement of a differential pressure $\Delta p$ and of a flow Q, at least two approximated pump characteristics $P_n$ and $\Delta\tilde{p}_n$, wherein each of the approximated pump characteristics $P_n$ and $\Delta\tilde{p}_n$ is unambiguously defined by a pair of parameters ($\theta_1$, $\theta_2$; $\theta_3$, $\theta_4$), wherein the control module is configured to store the pair of parameters ($\theta_1$, $\theta_2$; $\theta_3$, $\theta_4$) for each of the determined approximated pump characteristics $P_n$ and $\Delta\tilde{p}_n$, the operating parameter being preferably one of a number of the running pumps or a load point, wherein the load point is determined by the power consumption P and/or speed w of at least one of the n running pumps.

The outlet pressure of a multi-pump system is often known or controlled to a set value, but the inlet pressure is often unknown, so that a pressure difference $\Delta p$ between the inlet pressure and the outlet pressure is often unknown. Said multi-pump control system is, however, able to quickly determine, without the need of measuring and monitoring a pressure differential $\Delta p$, an energy-efficient number of running pumps in a certain range of load points. There is also no need for a flow meter to measure the flow Q. Preferably, all pumps of the multi-pump system can be considered to be identical in type, size and performance. The multi-pump system may comprise any number of two or more pumps.

Preferably, a current power consumption P is measured for at least one of the n running pumps and provided to the control system in form of a signal that is indicative of the currently consumed power P. The control system may receive the information about the current speed $\omega$ of the at least one of the running pumps in form of an absolute or relative value, which may be a measured or set speed value. For instance, the speed information may be provided as a percentage of maximum pump speed.

Preferably, the processing module may be configured to use a scaled flow $\tilde{Q}$ and a scaled pressure differential $\Delta\tilde{p}_n$ for obtaining the pairs of parameters ($\theta_1$, $\theta_2$; $\theta_3$, $\theta_4$). Please note that the tilde "~" above a variable shall indicate herein that this variable is scaled. Preferably, the scaled flow $\tilde{Q}$ and a scaled pressure differential $\Delta\tilde{p}_n$ are scaled in such a way that a normalisation is achieved that reduces the number of parameters to said pairs of parameters ($\theta_1$, $\theta_2$; $\theta_3$, $\theta_4$).

Preferably, the speed of each pump is controlled by a variable frequency controller (VFC) module being part of or connected to each pump, wherein at least one sensor provides a control signal as a feedback value in a closed-loop control of the multi-pump system in order to run a certain number of pumps at a certain speed to establish a stable target performance. For instance, a stable target outlet pressure may be established by receiving an outlet pressure measured by an outlet pressure sensor and controlling the multi-pump system in a closed-loop pressure control. Alternatively, or in addition, the multi-pump system may be used to establish a stable target temperature by using a temperature feedback from a temperature sensor.

Preferably, it can be assumed that a certain number of identical running pumps runs with an overall minimal energy consumption when all running pumps run at the same speed. The multi-pump control system is able to decide on the most energy-efficient number of running pumps preferably by comparing the actual total power consumption $P_n$ of n running pumps with a previously predicted total power consumption $\hat{P}_m$ of m running pumps. If $P_n > \hat{P}_m$, then the number of running pumps is changed from n to m. The actual total power consumption $P_n = nP$, wherein P is the actual power consumption of one running pump, may be an actual value provided by one or more of the VFCs of the running pumps.

Optionally, for the determination or updating of the pairs of parameters ($\theta_1$, $\theta_2$; $\theta_3$, $\theta_4$), the at least two different changes of the number n of running pumps may differ from each other by the number n of running pumps before and after the respective change and/or by a load point during the respective change, wherein the load point is determined by the power consumption P and/or speed ω of at least one of the n running pumps.

Optionally, the approximated pump characteristics $P_n$ and $\Delta \tilde{p}_n$ may be defined by the formulas $$P_n = n\left(\theta_1 \omega_n^3 + \tilde{Q}\omega_n^2 \frac{1}{n} + \theta_2 \tilde{Q}^2 \omega_n \frac{1}{n^2}\right) \text{ and}$$

$$\Delta \tilde{p}_n = \theta_3 \omega_n^2 + \theta_4 \tilde{Q}\omega_n \frac{1}{n} + \tilde{Q}^2 \frac{1}{n^2},$$

wherein $\tilde{Q} = b_P Q$ denotes a scaled approximated flow with $b_P$ being a scaling factor, wherein $\theta_1$, $\theta_2$ denote a first pair of said parameters and $\theta_3$, $\theta_4$ denote a second pair of said parameters. Preferably, $b_P$ functions as a normalisation factor for reducing the number of parameters needed to approximate one of the pump characteristics from three to two.

Optionally, the processing module may be configured to determine those pairs of parameters ($\theta_1$, $\theta_2$; $\theta_3$, $\theta_4$) for which a difference between an actual total power consumption $P_m$ of m running pumps after a change of the number of running pumps from n to m and a previously predicted total power consumption $\hat{P}_m$ is minimal. The predicted power consumption $\hat{P}_m = f_\theta(P_n, \omega_n, n, m)$ for running m pumps in the future may be a function of the current power consumption $P_T$, at currently running n pumps, the current pump speed $\omega_n$, the current number n of running pumps and the future number m of running pumps after the cut-in/out of a pump. In certain embodiments of the control method and system described herein, the prediction function $f_\theta$ may be a map defined by a neural network or another multivariate analysis. A preferred implementation of $f_\theta$ may be based on previously determined pairs of parameters ($\theta_1$, $\theta_2$; $\theta_3$, $\theta_4$) defining the pump characteristics $P_n$ and $\Delta \tilde{p}_n$. However, the prediction function $f_\theta$ may take more parameters into account for providing a predicted total power consumption $\hat{P}_m$.

Optionally, the control module may be configured to operate the multi-pump system with the number n of running pumps at the speed $\omega_n$ having the least total power consumption Pi at a required load point under the condition that the speed $\omega_n$ lies between a predetermined maximum speed and a predetermined minimum speed of the n running pumps.

Optionally, the processing module may be configured to validate the pairs of parameters ($\theta_1$, $\theta_2$; $\theta_3$, $\theta_4$) before they are stored, wherein the pairs of parameters ($\theta_1$, $\theta_2$; $\theta_3$, $\theta_4$) are validated if the parameters fulfil predetermined validation criteria.

Optionally, the processing module may be configured to validate the pairs of parameters ($\theta_1$, $\theta_2$; $\theta_3$, $\theta_4$) during a ramp-up/down of at least one pump.

Optionally, the processing module may be configured to validate the pairs of parameters ($\theta_1$, $\theta_2$; $\theta_3$, $\theta_4$) before they are stored, wherein the pairs of parameters ($\theta_1$, $\theta_2$; $\theta_3$, $\theta_4$) are validated if the actual total power consumption $P_m$ of m running pumps after a change of the number of running pumps from n to m lies within a range about a previously predicted total power consumption $\hat{P}_m$.

Optionally, the processing module may be configured to determine at least one parameter $$\theta_1 \propto \frac{P}{\omega^3}$$

during a ramp-up/down of at least one pump before it starts/stops contributing to the total flow Q.

Optionally, the processing module may be configured to validate the pairs of parameters ($\theta_1$, $\theta_2$; $\theta_3$, $\theta_4$) only if the at least one $$\theta_1 \propto \frac{P}{\omega^3}$$

has significantly changed during a ramp-up/down of at least one pump.

Optionally, the processing module may be configured to regularly, periodically or sporadically update the pairs of parameters ($\theta_1$, $\theta_2$; $\theta_3$, $\theta_4$).

Optionally, the communication interface may be configured to trigger a no-flow alarm if the actual total power consumption $P_n$ fulfils the formula $P_n \leq \theta_1 \omega_n^3 \alpha$, wherein α defines an alarm threshold.

According to a further aspect of the present disclosure, a method for controlling a multi-pump system is provided, wherein the method comprises the following steps:

changing a number n of running pumps of a multi-pump system, receiving a signal indicative of a power consumption P and information about a speed ω of at least one of the n running pumps before and after at least two different changes of the number n of running pumps, determining, before and after at least two different changes of the number n of running pumps, in absence of a measurement of a differential pressure Δp and of a flow Q, at least two approximated pump characteristics $P_n$ and $\Delta \tilde{p}_n$, wherein each of the approximated pump characteristics $P_n$ and $\Delta \tilde{p}_n$ is unambiguously defined by a pair of parameters ($\theta_1$, $\theta_2$; $\theta_3$, $\theta_4$), and storing the pair of parameters ($\theta_1$, $\theta_2$; $\theta_3$, $\theta_4$) for each of the determined approximated pump characteristics $P_n$ and $\Delta \tilde{p}_n$.

Optionally, the at least two different changes of the number n of running pumps may differ from each other by the number n of running pumps before and after the respective change and/or by a load point during the respective change, wherein the load point is determined by the power consumption P and/or speed ω of at least one of the n running pumps.

Preferably, a scaled flow $\tilde{Q}$ and a scaled pressure differential $\Delta \tilde{p}_n$ may be used for obtaining a re-parametrization of the approximated pump characteristics $P_n$ and $\Delta \tilde{p}_n$, wherein neither the actual flow Q nor the actual pressure differential Δp is measured, determined or estimated.

Optionally, the approximated pump characteristics $P_n$ and $\Delta \tilde{p}_n$ may be defined by the formulas $$P_n = n\left(\theta_1 \omega_n^3 + \tilde{Q}\omega_n^2 \frac{1}{n} + \theta_2 \tilde{Q}^2 \omega_n \frac{1}{n^2}\right) \text{ and}$$

$$\Delta \tilde{p}_n = \theta_3 \omega_n^2 + \theta_4 \tilde{Q}\omega_n \frac{1}{n} + \tilde{Q}^2 \frac{1}{n^2},$$

wherein $\tilde{Q}=b_P Q$ denotes a scaled approximated flow with $b_P$ being a scaling factor, wherein $\theta_1$, $\theta_2$ denote a first pair of said parameters and $\theta_3$, $\theta_4$ denote a second pair of said parameters.

Optionally, the method may further comprise a step of determining the pairs of parameters ($\theta_1$, $\theta_2$; $\theta_3$, $\theta_4$) for which a difference between an actual total power consumption $P_m$ of m running pumps after a change of the number of running pumps from n to m and a previously predicted total power consumption $\hat{P}_m$ is minimal.

Optionally, the method may further comprise a step of operating the multi-pump system with the number n of running pumps at the speed ω-having the least total power consumption $P_n$ at a required load point under the condition that the speed $\omega_n$ lies between a predetermined maximum speed and a predetermined minimum speed of the n running pumps.

Optionally, the method may further comprise a step of validating the pairs of parameters ($\theta_1$, $\theta_2$; $\theta_3$, $\theta_4$) before they are stored, wherein the pairs of parameters ($\theta_1$, $\theta_2$; $\theta_3$, $\theta_4$) are validated if the parameters fulfil predetermined validation criteria.

Optionally, the pairs of parameters ($\theta_1$, $\theta_2$; $\theta_3$, $\theta_4$) may be validated during a ramp-up/down of at least one pump.

Optionally, the method may further comprise a step of validating the pairs of parameters ($\theta_1$, $\theta_2$; $\theta_3$, $\theta_4$) before they are stored, wherein the pairs of parameters ($\theta_1$, $\theta_2$; $\theta_3$, $\theta_4$) are validated if the actual total power consumption $P_m$ of m running pumps after a change of the number of running pumps from n to m lies within a range about a previously predicted total power consumption $\hat{P}_m$.

Optionally, the method may further comprise a step of determining at least one parameter $$\theta_1 \propto \frac{P}{\omega^3}$$

during a ramp-up/down of at least one pump before it starts/stops contributing to the total flow Q.

Optionally, the pairs of parameters ($\theta_1$, $\theta_2$; $\theta_3$, $\theta_4$) may be only validated if the at least one parameter $$\theta_1 \propto \frac{P}{\omega^3}$$

has significantly changed during a ramp-up/down of at least one pump.

Optionally, the method may further comprise a step of regularly, periodically or sporadically updating the pairs of parameters ($\theta_1$, $\theta_2$; $\theta_3$, $\theta_4$).

Optionally, the method may further comprise a step of triggering a no-flow alarm if the actual total power consumption $P_n$ fulfils the formula $P_n \leq \theta_1 \omega_n^3 \alpha$, wherein α defines an alarm threshold.

According to a further aspect of the present disclosure, a computer readable medium with instructions for executing the method described above is provided.

The method described above may be implemented in form of compiled or uncompiled software code that is stored on a computer readable medium with instructions for executing the method. Alternatively, or in addition, the method may be executed by software in a cloud-based system, i.e. one or more of the modules of the controls system, in particular the processing module may be implemented in a cloud-based system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Embodiments of the present disclosure will now be described by way of example with reference to the following figures of which.

DETAILED DESCRIPTION

Figure 1:
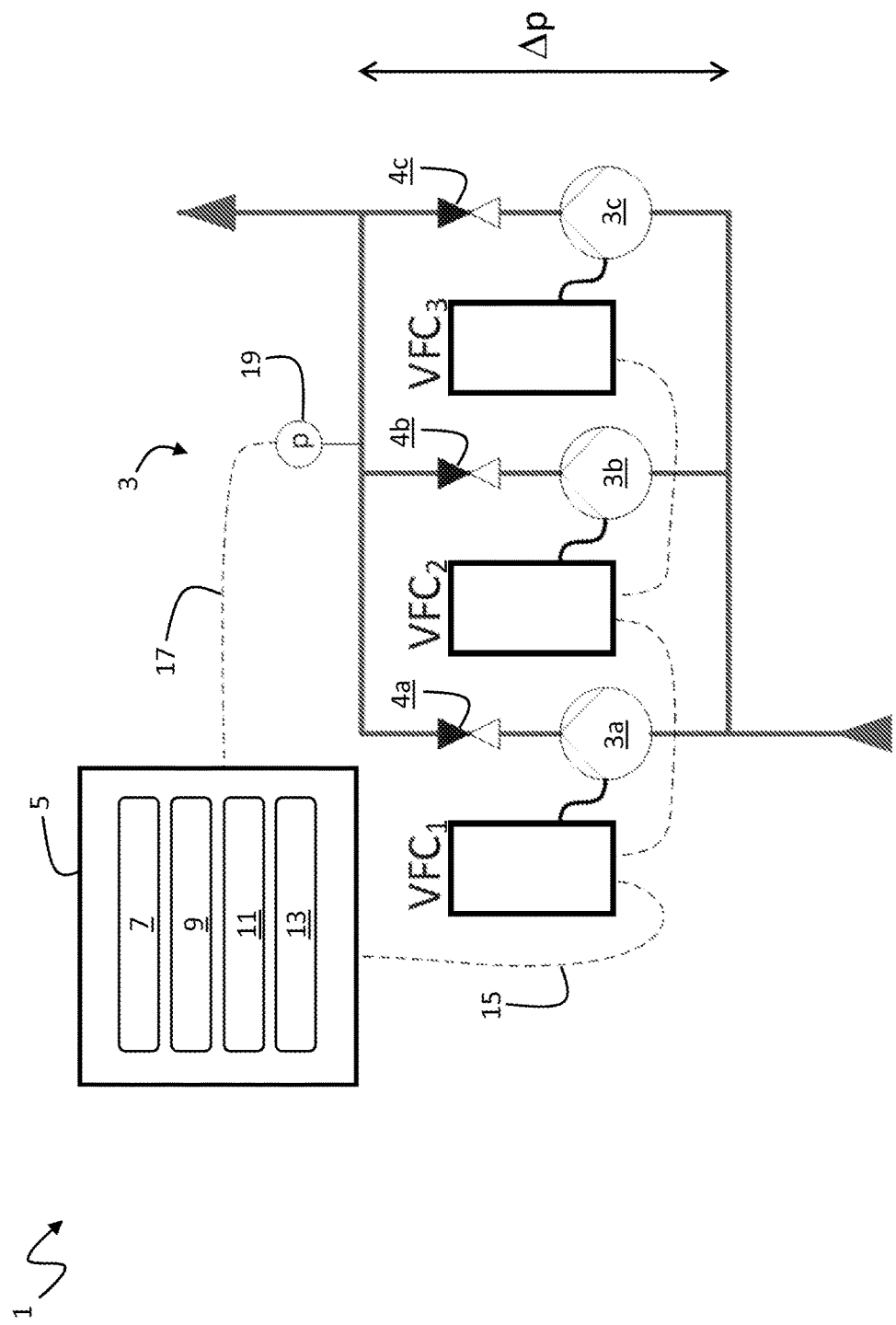
FIG. 1 shows schematically a fluid supply network supplied by a multi-pump system controlled by an example of a multi-pump control system according to the present disclosure.

FIG. 1 shows a fluid network 1 supplied by a multi-pump system 3 of three pumps 3a, 3b, 3c. The fluid network 1 may, for instance, be a heating or cooling cycle. The fluid network 1 does not need to be a closed loop cycle. It may comprise two reservoirs, wherein the multi-pump system 3 is installed to pump fluid, e.g. water, from one reservoir to the other. In this example, the pumps 3a, 3b, 3c, of the multi-pump system 3 are installed in parallel. The pumps 3a, 3b, 3c of this example are also of nominally the same type and size. For each of the pumps 3a, 3b, 3c, there is an associated valve 4a, 4b, 4c arranged in the fluid network 1 to prevent a back-flow through a non-running pump. Such a multi-pump system 3 may be referred to as a booster system, which is able to provide a broad range of pumping power depending on a current flow demand in the fluid network 1.

A multi-pump control system 5, comprising a control module 7, a processing module 9, communication interface 11, and a storage module 13, is in direct or indirect, wireless or wired communication connection with variable frequency control units $VFC_1$, $VFC_2$, $VFC_3$ of the respective pumps 3a, 3b, 3c. The communication interface 11 is configured to send signals to and receive signals from the variable frequency control units $VFC_1$, $VFC_2$, $VFC_3$ via bi-directional communication line 15. The communication line 15 may be a bus line as shown in FIG. 1 or a plurality of individual communication lines between the control system 5 and the variable frequency control units $VFC_1$, $VFC_2$, $VFC_3$. Furthermore, in the embodiment shown in FIG. 1, there is a signal connection 17 between the control system 5 and an outlet pressure sensor 19. The outlet pressure sensor 19 is arranged in the fluid network 1 to measure the total outlet pressure of the multi-pump system 3 consisting of the three pumps 3a, 3b, 3c.

The processing module 9 is configured to process received signals and to execute calculations based on the received signals. The signals may be received by the communication interface 11 from the variable frequency control units $VFC_1$, $VFC_2$, $VFC_3$ via communication line 15 and/or from the outlet pressure sensor 19 via signal connection 17. The storage module 13 is configured to store the results of the calculations performed by the processing module 9.

The control module 7 is configured to control the operation of the pumps 3a, 3b, 3c based on the stored results by sending commands through the communication interface 11 via bi-directional communication line 15 to the variable frequency control units $VFC_1$, $VFC_2$, $VFC_3$. It should be noted that the control module 7, the processing module 9, the communication interface 11, and the storage module 13 may be physically distributed over the control system 5, which is preferably comprised within a single control unit, e.g. a computer device comprising a CPU, a permanent or temporary data storage and a network connection. Alternatively, some or all of the modules 7, 9, 11, 13 may be arranged in physically separate units being in signal connection with each other. Two or more of the modules may be combined in a combined is module, so that the functionality of more than one module may be provided by such a combined module.

Figure 2:
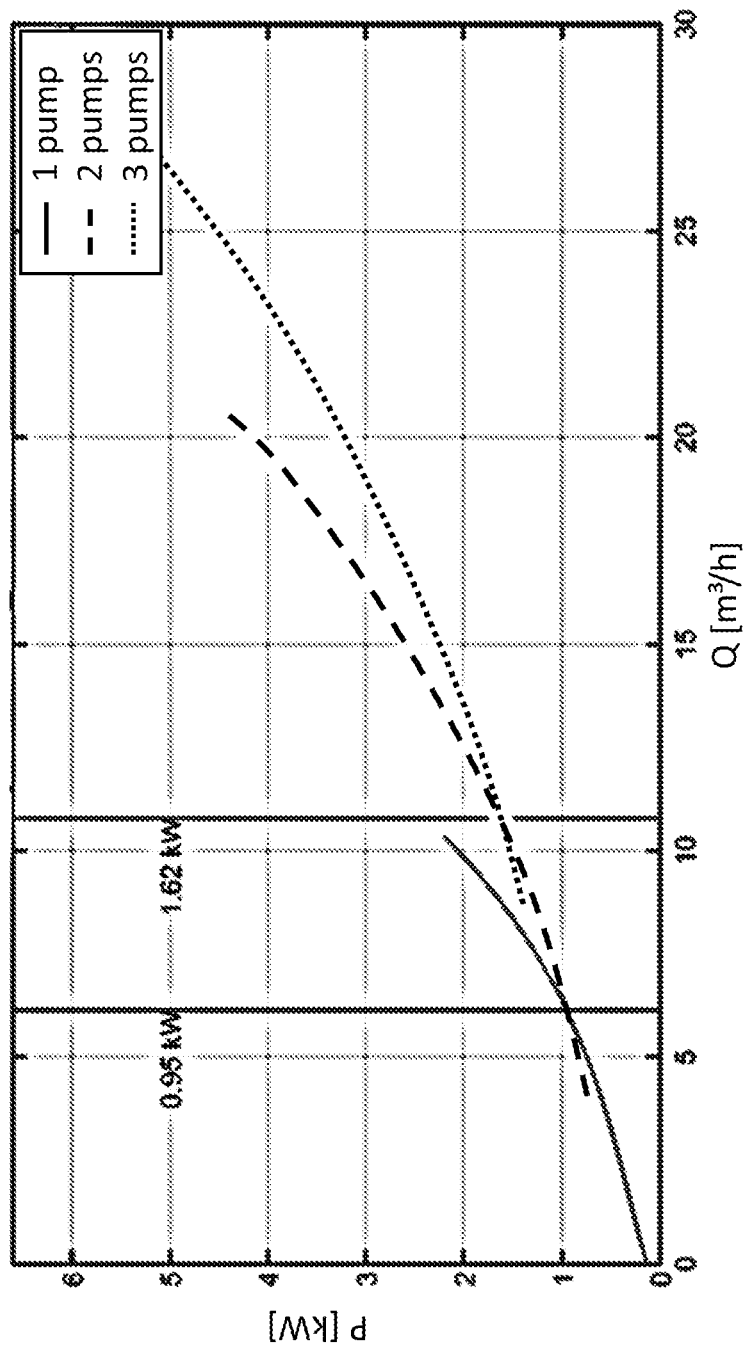
FIG. 2 shows theoretical PQ-diagrams for operating the multi-pump system with one, two or three running pumps, wherein the outlet pressure is controlled to be constant and the inlet pressure is assumed to be constant.

FIG. 2 shows a theoretical diagram of the total consumed power P as a function of total provided flow Q for the three options to run the multi-pump system 3 with one, two or three of the three pumps 3a, 3b, 3c, wherein the outlet pressure is controlled to be constant and the inlet pressure is assumed to be constant. Herein, it is assumed that all three pumps 3a, 3b, 3c are identical and that only the number n of running pumps is relevant, not which ones of the three pumps 3a, 3b, 3c. As can be seen from the example shown in FIG. 2, it is here most energy-efficient to run the multi-pump system 3 with only one pump if a flow Q of less than 6 m³/h is needed. A flow demand between 6 and 11 m³/h is preferably served by running two pumps and a flow above 11 m³/h is most provided most energy-efficiently by three pumps. Thus, there are two optimal switching points at a total power consumption of 0.95 kW and 1.62 kW, respectively, for switching from a one-pump operation to a two-pump operation and for switching from a two-pump operation to a three-pump operation, respectively. However, the theoretical model shown in FIG. 2 assumed knowledge of the total flow Q, which is often not available in absence of a flow meter. If the inlet pressure into the multi-pump system 3 is also not known, there is also no possibility to estimate the total flow Q based on a pressure differential $\Delta p$. Furthermore, the inlet pressure may change over time, which would shift the optimal switching points as the pressure differential $\Delta p$ changes to an unknown value. There is thus a need to automatically update the "knowledge about the optimal switching points" whenever the inlet pressure has changed.

The present disclosure, provides a solution to quickly and reliably find the best switching points for cutting in/out a pump in absence of a measurement of the total flow Q or the pressure differential $\Delta p$. The control method and system described herein provides a quick and reliable way to predict a total power consumption $\hat{P}_m$ if the multi-pump system 3 were run with m pumps instead of the currently running n pumps, wherein in $=n+1$ or $=n-1$. The predicted total power consumption $\hat{P}_m$ may be used to compare it with the actual current total power consumption $P_n$ to decide if it is more energy-efficient to run with m pumps instead of n pumps.

The total power consumption $P_n$ for running n pumps can be predicted on the basis of a general model. This general model may be denoted in form of the following formulas:

$$P_n = n\left(a_P\omega_n^3 + b_P Q\omega_n^2 \frac{1}{n} + c_P Q^2 \omega_n \frac{1}{n^2}\right)$$

$$\Delta p_n = a_h\omega_n^2 + b_h Q\omega_n \frac{1}{n} + c_h Q^2 \frac{1}{n^2},$$

where Q is the total flow through the multi-pump system 3, $\omega_n$ is the speed of the n running pumps, $\Delta\tilde{p}_n$ is the pressure differential delivered by the n running pumps. Moreover, $a_P, b_P, c_P$ and $a_h, b_h, c_h$ are model parameters that model the operational performance of one of the pumps 3a,b,c of the multi-pump system 3 shown in FIG. 1. The inventive idea is now to use a scaling for predicting the total power consumption $P_n$ independently of the current load point defined by the current total flow Q. Thereby, the model parameters can be continuously or regularly updated even if the load point, e.g. defined by the total flow Q, changes between the predictions. Furthermore, the scaling is used to reduce the number of model parameters needed for the prediction. For example, the total flow Q may be scaled by the model parameter $b_P$ as follows to re-parametrize the pump characteristics using a "scaled flow" $\tilde{Q}$:

$$\tilde{Q} = b_P Q.$$

Similarly, the pressure differential $\Delta p$ may be scaled by the model parameters $b_P$ and $c_h$ as follows to get a "scaled pressure differential" $\Delta\tilde{p}_n$:

$$\Delta\tilde{p}_n = \frac{b_P^2}{c_h}\Delta p_n.$$

This results in a scaled model parametrization as follows:

$$P_n = g_\theta(\tilde{Q}, \omega_n, n) = n\left(\theta_1\omega_n^3 + \tilde{Q}\omega_n^2 \frac{1}{n} + \theta_2\tilde{Q}^2 \omega_n \frac{1}{n^2}\right),$$

$$\Delta\tilde{p}_n = h_\theta(\tilde{Q}, \omega_n, n) = \theta_3\omega_n^2 + \theta_4\tilde{Q}\omega_n \frac{1}{n} + \tilde{Q}^2 \frac{1}{n^2}.$$

In the above scaled model parametrization, the scaled flow $\tilde{Q}$ and the scaled pressure differential $\Delta\tilde{p}_n$ are unknown variables, and $\theta_1$, $\theta_2$ and $\theta_3$, $\theta_4$ are pairs of model parameters. Thus, by way of the scaling, the number of parameters was reduced from six to four. It is possible to formulate an optimization problem, which minimizes the difference between the predicted power consumption $\hat{P}_7$, after the change from n running pumps to m running pumps and the actual total power consumption $P_m$ when running with m pumps. The optimization problem may be formulated by $$\min_{\theta} \sum_{n \to m} (P_m - \hat{P}_m)^2,$$

wherein the predicted power consumption $\hat{P}_m = f_\theta(P_n, \omega_n, n, m)$ for running m pumps in the future is a function of the current power consumption $P_n$ at currently running n pumps, the current pump speed $\omega_n$, the current number n of running pumps and the future number m of running pumps after the cut-in/out of a pump. In certain embodiments of the control method and system described herein, $f_\theta$ may be a map defined by a neural network or another multivariate analysis. A preferred implementation of $f_\theta$ may be based on previously determined pump characteristics and may be given by the following set of equations. Such an implementation is particularly interesting as it depends on only a few parameters and therefore converges very fast:

$$\tilde{Q} = g_\theta^{-1}(P_n, \omega_n, n),$$

$$\Delta\tilde{p} = h_\theta(\tilde{Q}, \omega_n, n),$$

$$\omega_m = h_\theta^{-1}(\Delta\tilde{p}, \tilde{Q}, m),$$

$$\hat{P}_m = g_\theta(\tilde{Q}, \omega_m, m).$$

Once the pairs of model parameters $\theta_1$, $\theta_2$ and $\theta_3$, $\theta_4$ are determined, the predicted power consumption $\hat{P}_m$ can be compared with the current power consumption to decide whether it is more energy efficient to run with m pumps rather than n pumps. However, the pairs of model parameters $\theta_1$, $\theta_3$ and $\theta_3$, $\theta_4$ may change over time, for example due to a change of the inlet pressure, and may thus require to be continuously or regularly updated. As the functions $g_\theta^{-1}$ and $h_\theta^{-1}$ are nonlinear in the pairs of model parameters $\theta_1$, $\theta_2$ and $\theta_3$, $\theta_4$, the optimization problem described above may be difficult to solve. In the following, control schemes are described as examples that facilitate a quick and reliable updating of the pairs of model parameters $\theta_1$, $\theta_2$ and $\theta_3$, $\theta_4$.

Figure 3:
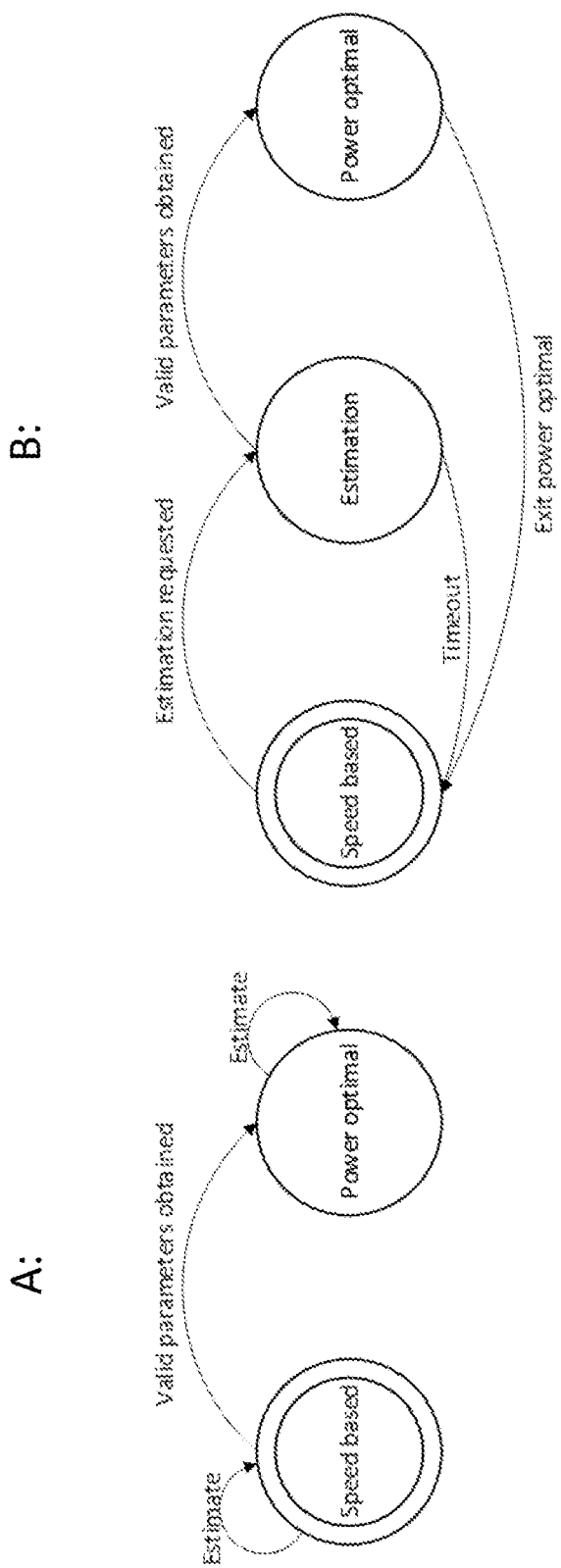
FIG. 3 shows schematically two examples of control schemes of a control method according to the present disclosure.

FIG. 3 shows two control schemes A, B for controlling the multi-pump system 3. According to the scheme A on left-hand side, the pairs of model parameters $\theta_1$, $\theta_2$ and $\theta_3$, $\theta_4$ are continuously determined and updated, whereas according to the scheme B on the right-hand side, an estimation mode is explicitly requested for updating the pairs of model parameters $\theta_1$, $\theta_2$ and $\theta_3$, $\theta_4$. In both schemes A, B, the multi-pump control system 5 may selectively operate in an ordinary speed-based mode and in a power is optimised mode. The ordinary speed-based mode may have fixed defined load points for cutting in/out of a pump, e.g. cutting in a pump at 85% speed and cutting out a pump at 60% speed. However, these may not be the most energy-efficient load points to change the number of running pumps. However, during the speed-based mode, the pairs of model parameters $\theta_1$, $\theta_2$ and $\theta_3$, $\theta_4$ may be determined to allow for a switch to the power optimised mode.

In order to decide when a switch to the power optimised mode is preferable, the pairs of parameters $\theta_1$, $\theta_2$ and $\theta_3$, $\theta_4$ are preferably validated before they are stored by the storage module 13. For instance, the pairs of parameters $\theta_1$, $\theta_2$ and $\theta_3$, $\theta_4$ are validated if the parameters fulfil predetermined validation criteria, e.g. by checking the expected sign of the parameters:

$$\theta_2 < 0,$$

$$\theta_3 < 0.$$

Furthermore, a further validation criterium may be applied like:

$$P_m < \hat{P}_m(1+\beta) \lor P_m > \tilde{P}_m(1-\beta),$$

wherein $\beta \geq 0$ is a predetermined margin defining acceptable deviation between the estimated power consumption $\hat{P}_m$ for running with m pumps and the actual power consumption $P_m$ when running with m pumps.

If the above validation criteria are not fulfilled, they are not stored and updated. A shift from the speed control mode to the power optimised mode may then be rejected. The validation is preferably performed during a ramp-up/down of at least one pump before it starts contributing to the total flow Q. As long as a running pump does not provide flow, i.e. Q=0, the parameter $\theta_1$ can be determined by:

$$P = \theta_1 \omega^3 \Leftrightarrow \theta_1 = \frac{1}{\omega^3}P$$

Figure 4:
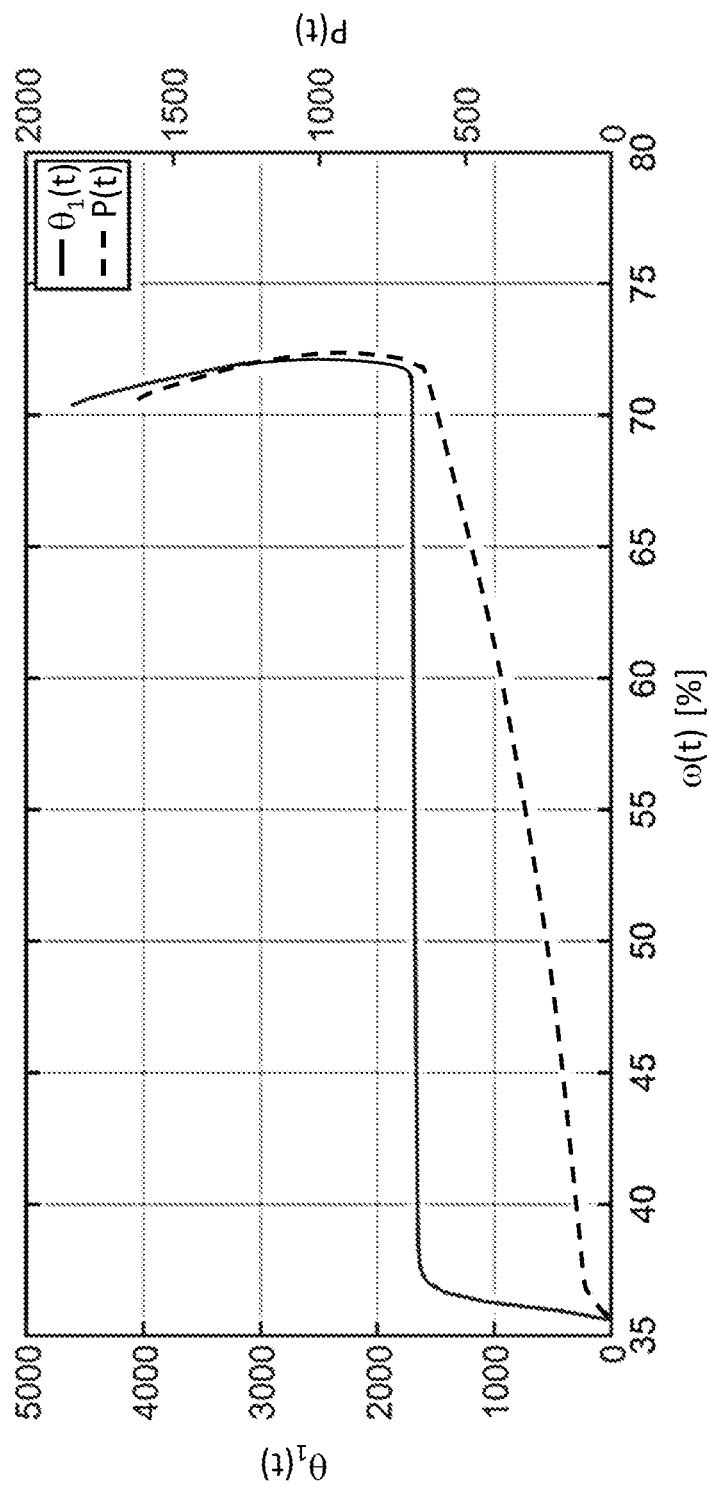
FIG. 4 shows the parameter $\theta_1$ and the power consumption P in arbitrary units as a function of the pump speed ω (in percent of the maximum speed) over time t.

FIG. 4 shows how the parameter $\theta_1$ and the power consumption P develop over time as the pump is ramped up. The parameter $\theta_1$ is relatively stable during ramp-up as long as the pump does not contribute to the total flow Q. However, there is a very steep increase of the power consumption and of the parameter $\theta_1$ in the moment the pump starts contributing to the total flow Q. In this moment, the pressure control actually quickly slightly reduces the pump speed in order to not exceed a target outlet pressure. Vice versa, if no change in parameter $\theta_1$ is observed during ramp-up of an additional pump to the speed of the pump(s) already running, the pump is not providing flow. Hence, the cut-in of the pump fails and the pump is ramped down again the parameters are not considered valid, i.e., they are not stored and updated. A shift from the speed control mode to the power optimised mode may then be rejected.

For the control scheme B on the right-hand side of FIG. 3, there are two routes back the speed-based based control mode. Firstly, a timeout during the requested estimation indicates that no valid parameter set could be found within a given time period. Secondly, a manually triggered or automatically triggered exit from the power optimised mode. For instance, to system changes may trigger automatically an exit from the power optimised mode. For instance, the following validation criterium may be regularly checked:

$$P_m < \hat{P}_m(1+\beta) \lor \tilde{P}_m > \tilde{P}_m(1-\beta).$$

A system change is indicated as soon as this criterium is suddenly not met anymore.

If the current parameter $\theta_1$ is known or previously validated, a no-flow alarm may be issued if a running pump suddenly stops contributing to the flow Q, which is indicated if the measured power consumption is not any more larger than estimated zero flow power consumption plus a margin a, i.e. the following criterium is not anymore fulfilled:

$$P_{meas} > \theta_1 \omega^3 \alpha,$$

wherein α>1 is a pre-determined margin defining the alarm threshold.

Figure 5:
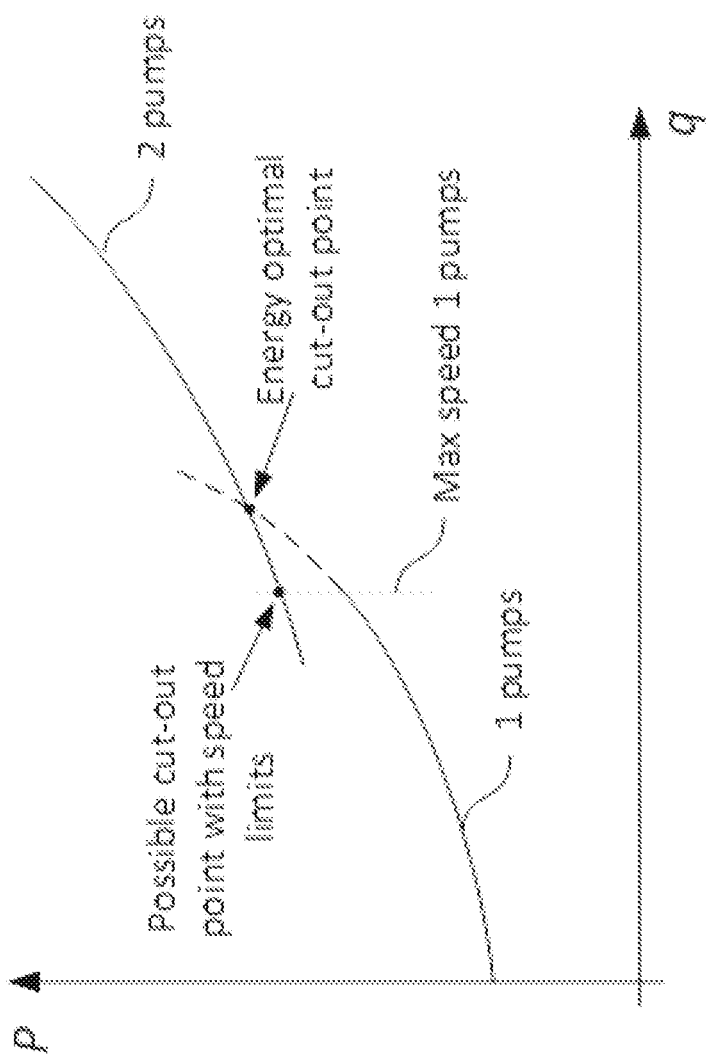
FIG. 5 shows theoretical PQ-diagrams for operating the multi-pump system with one or two pumps under the constraint of a maximum pump speed.

There may be further constraints to the most energy-efficient load points for cutting in/out pumps. For instance, in some embodiments of multi-pump systems, a speed limit of a pump may be reached before the most energy-efficient load point can be reached. An example of this is shown in FIG. 5. The energetically optimal cut-out point for switching from a 2-pump operation to a 1-pump operation during reducing the flow may lie above the maximum pump speed of one pump. It may thus be necessary to continue with the 2-pump operation until a cut-out of one pump is possible and the remaining pump is run at maximum speed. Preferably, the speed of the pumps after cut-out is predicted by the control method described herein and compared with the known speed limits of the multi-pump system. This means that the control method described herein is able to find the best possible cut-out point taking the speed limits into account. Thereby, it may be ensured that the multi-pump system is operated as energy-efficiently as possible while assuring that the system control objective is still fulfilled. It should be noted that similar constraints are applicable for a cut-in. Furthermore, the pumps may also have a known lower speed limit that may be taken into account for cutting in/out at load points with low head. However, the lower speed limit may already be taken into account as part of a feature in the closed-loop pressure control for preventing a controller windup, so that a further pump may be forced to switch on and run at least with minimum speed if the target head is not achieved.

Figure 6:
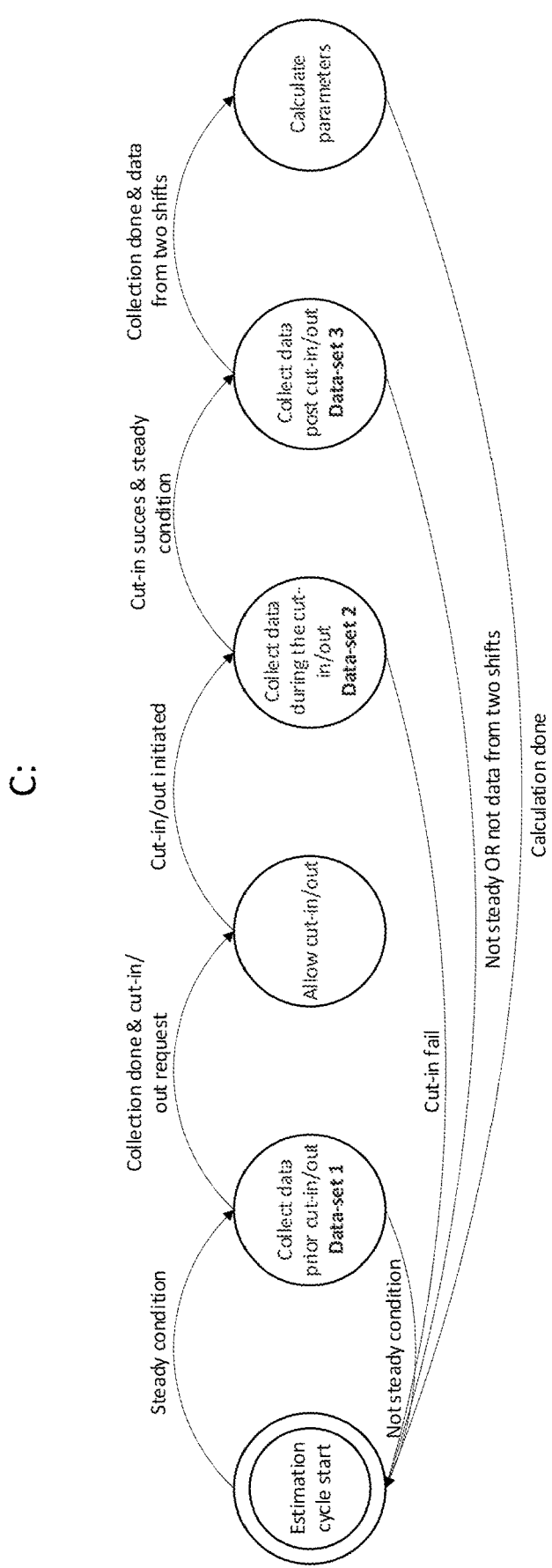
FIG. 6 shows schematically a further examples of a stepwise control scheme of a control method according to the present disclosure.

FIG. 6 shows a stepwise control scheme C as a further embodiment for implementing the control method described herein. As a first step, when an estimation or updating cycle starts, it may be checked if the multi-pump system runs under steady conditions. For instance, the closed-loop feedback from the pressure sensor 19 to the control module 7 should indicate that the set target outlet pressure is currently provided by the running multi-pump system. The estimation cycle may not continue or restart if the current operation is found not to be steady. Once the current operation is found to be steady, data may be collected and temporarily stored prior to a cut-in/out. The data may be denoted as Data-set 1, preferably comprising at least the current number of running pumps, the current total power consumption and the current pump speed. Once, the Data-set 1 is collected and stored, a cutting-in/out of a pump may be initiated as a third step if it is predicted to be more energy-efficient to do so, as described above. During the cutting-in/out of a pump, a Data-set 2 may be collected and temporarily stored in order to determine, and potentially update, the parameter $\theta_1$. This can be done as described above for a cut-in during the ramp-up phase of a pump before it starts contributing to the total flow Q or for a cut-out during the ramp-down phase of a pump after it ceased contributing to the total flow Q.

If an additional power consumption $P_0 = n\theta_0$ of the VFCs (idle power consumption) is non-negligible, a further parameter $\theta_0$ may be determined together with the parameter $\theta_1$ during the cutting-in/out of a pump. For the is pump, which is cut-in or cut-out, the pump characteristics in terms of power consumption before the pump contributes to the total flow Q may then be given by:

$$P(k) = \theta_0 + \theta_1 \omega(k)^3$$

wherein ω is the speed and P is the power consumption of the pump that is cut-in/out. The parameters $\theta+_0$ and $\theta^1$ may be identified from a series of power consumption and speed measurements during ramp up and ramp down of a pump. In case the idle power consumption $P_0$ of the VFC is negligible compared to the total power consumption, $\theta+_0$ may be set to zero, and the following expression leads to an estimation of $\theta_1$:

$$P = \theta_1 \omega^3 \Leftrightarrow \theta_1 = \frac{1}{\omega^3} P$$

It may, nevertheless, be beneficial for a robust determination of parameters to statistically determine the parameters $\theta_0$ and/or $\theta_1$ from a plurality of cut-in/out events during which data is collected and stored. For instance, an average value of previously determined parameters $\theta_0$ and/or $\theta_1$ may be used to update the parameters.

In a fourth step, a further Data-set 3 is collected and stored after the cut-in/out has been completed and the multi-pump system indicates steady operating conditions. As soon as the data sets of at least two different cut-in/out events have been collected and stored, the pairs of model parameters $\theta_1$, $\theta_2$ and $\theta_3$, $\theta_4$ may be fully determined and updated in a fifth step if they are found to be valid according to the applied validation criteria.

As shown in FIG. 6, certain events will initiate a restart of the estimation cycle. In addition to unsteady conditions during the estimation cycle, the estimation cycle may be restarted if the cut-in fails to be successful, i.e. the is new actual power consumption $P_m$ of running with m pumps lies within a range β about the power consumption $\hat{P}_m$ that was expected for running with m pumps according to the following validation criterium:

$$P_m < \hat{P}_m(1+\beta) \lor P_m > \hat{P}_m(1-\beta).$$

Furthermore, the fifth step of determining and updating the pairs of model parameters $\theta_1$, $\theta_2$ and $+\theta_3$, $\theta_4$ may only performed if data of at least two cut-in/out events was collected and stored. Otherwise, the estimation cycle is restarted to get the data from another cut-in/out event. It should be noted that the at least two different cut-in/out events should preferably be performed at different load points, preferably with different numbers of initially and finally running pumps.

Under the assumption that the total flow Q is essentially the same just before a cut-in/out of a pump and just after the cut-in/out of a pump, a scaled flow $\tilde{Q}_{nm}$ may be determined for changing from an operation with n running pumps to an operation with m running pumps by:

$$\tilde{Q}_{nm} = -\theta_1(n\omega_n + m\omega_m) + \frac{nP_n}{n\omega_n^2 - m\omega_n\omega_m} - \frac{mP_m}{n\omega_n\omega_m - m\omega_m^2}.$$

Therefore, the scaled flow $\tilde{Q}_{nm}$ can be determined from the collected data. The parameter $\theta_2$ may then be determined by:

$$P_n = \theta_1 n\omega_n^3 + \tilde{Q}_{nm}\omega_n^2 + \theta_2 \tilde{Q}_{nm}^2 \frac{1}{n}\omega_n \Leftrightarrow \theta_2 = \frac{nP_n - \theta_1 n^2 \omega_n^3 - \tilde{Q}_{nm} n\omega_n^2}{\tilde{Q}_{nm}^2 \omega_n}$$

or $$P_m = \theta_1 m\omega_m^3 + \tilde{Q}_{nm}\omega_m^2 + \theta_2 \tilde{Q}_{nm}^2 \frac{1}{m}\omega_m \Leftrightarrow \theta_2 = \frac{mP_m - \theta_1 m^2 \omega_m^3 - \tilde{Q}_{nm} m\omega_m^2}{\tilde{Q}_{nm}^2 \omega_m}$$

A second cut-in/out event may be performed at a different load point with a change from an operation with k running pumps to an operation with l running pumps. The second pair of parameters $\theta_3$, $\theta_4$ may then be determined by:

$$-\left(\frac{1}{n^2} - \frac{1}{m^2}\right)\tilde{Q}_{nm}^2 = \theta_3(\omega_n^2 - \omega_m^2) + \theta_4\left(\frac{\omega_n}{n} - \frac{\omega_m}{m}\right)\tilde{Q}_{nm}$$

$$-\left(\frac{1}{k^2} - \frac{1}{l^2}\right)\tilde{Q}_{kl}^2 = \theta_3(\omega_k^2 - \omega_l^2) + \theta_4\left(\frac{\omega_k}{k} - \frac{\omega_l}{l}\right)\tilde{Q}_{kl}$$

Please note that this method also works for a 2-pump system, i.e., the step k→l may be equal to the step m→n or the two cut-in/out events may be n→m and m→n. In this case, the load points between the two cut-in/out events may still be different if they are performed at different speeds ω and/or power consumptions P and/or total flows Q. This implies that the collection of data for the parameter update does not have to be performed by cut-in/out events at the most energy-efficient load points. For the sake of a parameter update alone, a cut-in/out event may be performed at a non-optimal load point.

Under the assumption that all pumps are identical, the determined parameters from cutting in one pump can be used for cutting in any other pump. However, tolerances, disturbances, different wear or fouling may impact the estimation of parameters depending on which pump was cut-in/out for determining the parameters. At is preferable to statistically determine the parameters from a plurality of cut-in/out events with different pumps. Thereby, a good average curve for all the pumps may be obtained by estimating parameters for all pumps and use the mean parameters for optimal sequencing. At the same time, this reduces the risk that one of the pumps is not able to deliver flow, because the parameter update would not have been successful and/or a no-flow alarm would have been triggered. Moreover, statistical outliers from deviating pumps will not cause the control method to start the power optimal mode when this would not be indicated by the other "normal" pumps.

A further embodiment of the control method may use the assumption that the unknown inlet pressure is constant. If the unknown constant inlet pressure is denoted as $p_0$, then the outlet pressure p is generally given by:

$$p = a_h\omega_n^2 + b_hQ\omega_n\frac{1}{n} + c_hQ^2\frac{1}{n^2} + p_0.$$

If the scaled flow $\tilde{Q}$ is now used to express the outlet pressure p, it follows:

$$p = \theta_3\omega_n^2 + \theta_4\tilde{Q}\omega_n\frac{1}{n} + \theta_5\tilde{Q}^2\frac{1}{n^2} + \theta_6,$$

wherein $\theta_5$, $\theta_6$ is a further pair of parameters to be determined by using the outlet pressure measured by the outlet pressure sensor 19. As described above, the parameters may be determined and updated in two different cut-in/out events k→l and m→n, wherein $\tilde{Q}_{nm} \neq \tilde{Q}_{kl}$ and $\omega_n \neq \omega_k$ and $\omega_m \neq \omega_l$ if k=m and l=n. The parameters may then be determined by:

$$p = \theta_3\omega_n^2 + \theta_4\tilde{Q}_{nm}\omega_n\frac{1}{n} + \theta_5\tilde{Q}_{nm}^2\frac{1}{n^2} + \theta_6$$

$$p = \theta_3\omega_m^2 + \theta_4\tilde{Q}_n\omega_m\frac{1}{m} + \theta_5\tilde{Q}_{nm}^2\frac{1}{m^2} + \theta_6$$

$$p = \theta_3\omega_k^2 + \theta_4\tilde{Q}_{kl}\omega_k\frac{1}{k} + \theta_5\tilde{Q}_{kl}^2\frac{1}{k^2} + \theta_6$$

$$p = \theta_3\omega_l^2 + \theta_4\tilde{Q}_{kl}\omega_l\frac{1}{l} + \theta_5\tilde{Q}_{kl}^2\frac{1}{l^2} + \theta_6$$

Please note that this embodiment requires a measurement of the outlet pressure, but not a measurement, determination or estimation of the pressure differential Δp. Therefore, the inlet pressure may remain unknown as long as it can be assumed to be constant. The previous embodiments of the control system and method does not even require a measurement of the outlet pressure, but it is usually equipped with a pressure sensor for providing a closed-loop pressure control for providing a set target outlet pressure.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been to shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE NUMERALS 1 fluid network
3 multi-pump system 3a,b,c pumps
4a,b,c valves
5 control system
7 control module
9 processing module
11 communication interface
13 storage module
15 communication line
17 signal connection
19 outlet pressure sensor

What is claimed is:

1. A multi-pump control system comprising:
   a control module;
   a processing module;
   a communication interface; and
   a storage module;
   wherein the control module is configured to change a number of running pumps of a multi-pump system;
   wherein the communication interface is configured to receive a signal indicative of a power consumption P and information about a speed ω of at least one of the running pumps before and after at least two different changes of an operating parameter of the running pumps;
   wherein the processing module is configured to determine, before and after at least two different changes of the operating parameter of the running pumps, without a measurement of a differential pressure and of a flow, at least two approximated pump characteristics, wherein each of the approximated pump characteristics is unambiguously defined by a pair of parameters;
selectively changing the number of operating pumps based on the pair of parameters.

2. A multi-pump control system according to claim 1, wherein the at least two different changes of the operating parameter of the running pumps differ from each other by one of the number of the running pumps before and after the respective change and by a load point during the respective change, wherein the load point is determined by one of the power consumption and speed of the at least one of the running pumps.

3. A multi-pump control system according to claim 1, wherein the approximated pump characteristics $P_n$ and $\Delta\tilde{p}_n$ are defined by the formulas $$P_n = n\left(\theta_1\omega_n^3 + \tilde{Q}\omega_n^2\frac{1}{n} + \theta_2\tilde{Q}^2\omega_n\frac{1}{n^2}\right) \text{ and } \Delta\tilde{p}_n = \theta_3\omega_n^2 + \theta_4\tilde{Q}\omega_n\frac{1}{n} + \tilde{Q}^2\frac{1}{n^2},$$

wherein $\tilde{Q}=b_P Q$ denotes a scaled approximated flow with $b_P$ being a scaling factor, wherein $\theta_1$, $\theta_2$ denote a first pair of the parameters and $\theta_3$, $\theta_4$ denote a second pair of the parameters, wherein n denotes the number of pumps, ω denotes a speed of the at least one of the n running pumps, and Q denotes the flow.

4. A multi-pump control system according to claim 1, wherein the processing module is configured to use a scaled flow and a scaled pressure differential for obtaining the pairs of parameters.

5. A multi-pump control system according to claim 1, wherein the processing module is configured to determine the pairs of parameters for which a difference between an actual total power consumption of m running pumps after a change of the number of the running pumps from n to m and a previously predicted total power consumption is minimal.

6. A multi-pump control system according to claim 1, wherein the control module is configured to operate the multi-pump system with the number of the running pumps at a speed having the least total power consumption at a required load point under a condition that the speed lies between a predetermined maximum speed and a predetermined minimum speed of the running pumps.

7. A multi-pump control system according to claim 1, wherein the processing module is configured to validate the pairs of parameters before the pairs of parameters are stored, wherein the pairs of parameters are validated if the parameters fulfil predetermined validation criteria.

8. A multi-pump control system according to claim 1, wherein the processing module is configured to validate the pairs of parameters before the pairs of parameters are stored, wherein the pairs of parameters are validated if an actual total power consumption of m running pumps after a change of the number of running pumps from n to m lies within a predetermined range about a previously predicted total power consumption.

9. A multi-pump control system according to claim 1, wherein the processing module is configured to determine at least one parameter $$\theta_1 \propto \frac{P}{\omega^3},$$

where P is the power consumption, and ω denotes the speed of the at least one of the running pumps, and during one of a ramp-up and ramp-down of the at least one pump before the at least one pump one of starts and stops contributing to a total flow.

10. A multi-pump control system according to claim 9, wherein the processing module is configured to validate the pairs of parameters only if the at least one parameter $$\theta_1 \propto \frac{P}{\omega^3}$$

has changed more than a predetermined amount during the one of the ramp-up and the ramp-down of the at least one pump.

11. A multi-pump control system according to claim 1, wherein the processing module is configured to one of regularly, periodically and sporadically update the pairs of parameters.

12. A multi-pump control system according to claim 1, wherein the communication interface is configured to trigger a no-flow alarm if an actual total power consumption $P_n$ fulfils the formula $P_n \leq \theta_1\omega_n^3\alpha$, wherein α defines an alarm threshold, n denotes the number of pumps, ω denotes the speed of the at least one of the n running pumps, and $\theta_1$ denotes one parameter of one pair of the pair of parameters.

13. A method for controlling a multi-pump system, the method comprising the steps of:
   changing a number of running pumps of a multi-pump system;
   receiving a signal indicative of a power consumption and information about a speed of at least one of the running pumps before and after at least two different changes of an operating parameter of the running pumps;
   determining, before and after at least two different changes of the operating parameter of the running pumps, without measurement of a differential pressure and of a flow, at least two approximated pump characteristics, wherein each of the approximated pump characteristics is unambiguously defined by a pair of parameters; and selectively changing the number of operating pumps based on the pair of parameters.

14. A method according to claim 13, wherein the at least two different changes of the operating parameter of the running pumps differ from each other by one of a number of the running pumps before and after the respective change, and by a load point during the respective change, wherein the load point is determined by one of the power consumption and the speed of the at least one of the running pumps.

15. A method according to claim 13, wherein a scaled flow and a scaled pressure differential is used for obtaining the pairs of parameters.

16. A method according to claim 13, wherein the approximated pump characteristics $P_n$ and $\Delta\tilde{p}_n$ defined by the formulas $$P_n = n\left(\theta_1\omega_n^3 + \tilde{Q}\omega_n^2\frac{1}{n} + \theta_2\tilde{Q}^2\omega_n\frac{1}{n^2}\right) \text{ and } \Delta\tilde{p}_n = \theta_3\omega_n^2 + \theta_4\tilde{Q}\omega_n\frac{1}{n} + \tilde{Q}^2\frac{1}{n^2},$$

wherein $\tilde{Q}=b_P Q$ denotes a scaled approximated flow with $b_P$ being a scaling factor, wherein $\theta_1$, $\theta_2$ denote a first pair of said parameters and $\theta_3$, $\theta_4$ denote a second pair of said parameters wherein n denotes the number of pumps, $\omega$ denotes the speed of the at least one of then running pumps, and Q denotes the flow.

17. A method according to claim 13, further comprising the step of determining the pairs of parameters for which a difference between an actual total power consumption of m running pumps after a change of the number of the running pumps from n to m and a previously predicted total power consumption is minimal.

18. A method according to claim 13, further comprising the step of operating the multi-pump system with the number of the running pumps at the speed having the least total power consumption at a required load point under the condition that the speed lies between a predetermined maximum speed and a predetermined minimum speed of the running pumps.

19. A method according to claim 13, further comprising the step of validating the pairs of parameters before the pairs of parameters are stored, wherein the pairs of parameters are validated if the parameters fulfil a predetermined validation criteria.

20. A method according to claim 13, further comprising the step of validating the pairs of parameters before the pairs of parameters are stored, wherein the pairs of parameters are validated if an actual total power consumption of m running pumps after a change of the number of the running pumps from n to m lies within a predetermined range about a previously predicted total power consumption.

21. A method according to claim 13, further comprising the step of determining at least one parameter $$\theta_1 \propto \frac{P}{\omega^3},$$

where P is the power consumption, and $\omega$ denotes the speed of the at least one of the running pumps, and during one of a ramp-up and ramp-down of the at least one pump before the at least one pump one of starts and stops contributing to a total flow.

22. A method according to claim 21, wherein the pairs of parameters are only validated if the at least one parameter $$\theta_1 \propto \frac{P}{\omega^3}$$

has changed more than a predetermined amount during the one of ramp-up and ramp-down of the at least one pump.

23. A method according to claim 13, further comprising the step of one of regularly, periodically and sporadically updating the pairs of parameters.

24. A method according to claim 13, further comprising the step of triggering a no-flow alarm if an actual total power consumption $P_n$ fulfils the formula $P_n \leq \theta_1 \omega_n^3 \alpha$, wherein $\alpha$ defines an alarm threshold, n denotes the number of pumps, $\omega$ denotes a speed of the at least one of the n running pumps, $\theta_1$ denotes one parameter of one pair of the pair of parameters.

25. A computer readable non-transitory medium with instructions for executing the method according to claim 13.

* * * * *